US012217918B2

(12) United States Patent
Lu et al.

(10) Patent No.: US 12,217,918 B2
(45) **Date of Patent: *Feb. 4, 2025**

(54) HIGH CURRENT, COMPACT FUSIBLE DISCONNECT SWITCH WITH DUAL SLIDER ASSEMBLY AND AN ACTUATOR BIAS ELEMENT

(71) Applicant: Eaton Intelligent Power Limited, Dublin (IE)

(72) Inventors: You Lu, Xi'an (CN); Xuecheng Zhang, Xi'an (CN); Robert S. Douglass, Wildwood, MO (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,841

(22) Filed: Jun. 30, 2023

(65) Prior Publication Data

US 2023/0343526 A1 Oct. 26, 2023

Related U.S. Application Data

(63) Continuation of application No. 17/368,080, filed on Jul. 6, 2021, now Pat. No. 11,735,384.

(30) Foreign Application Priority Data

Jul. 6, 2020 (CN) ........................ 202010643389.7

(51) Int. Cl.

*H01H 21/16* (2006.01)
*H01H 21/22* (2006.01)
*H01H 71/52* (2006.01)

(52) U.S. Cl.

CPC ............ *H01H 21/16* (2013.01); *H01H 21/22* (2013.01); *H01H 71/527* (2013.01)

(58) Field of Classification Search

CPC ...... H01H 21/16; H01H 21/22; H01H 85/203; H01H 85/54; H01H 2235/01; H01H 71/527
USPC ........................................................ 337/8
See application file for complete search history.

(56) References Cited

U.S. PATENT DOCUMENTS 2,329,362 A * 9/1943 Swingle ............... H01H 71/527 337/60
2,416,169 A * 2/1947 Freese .................... H01H 71/52 337/44
3,354,277 A * 11/1967 Stanback ............... H01H 73/02 337/8

(Continued)

*Primary Examiner* — Anatoly Vortman
(74) *Attorney, Agent, or Firm* — Baker Botts L.L.P.

(57) ABSTRACT

A fusible disconnect switch device is provided. The disconnect switch includes a switch actuator, an actuator bias element, and a slider assembly. The switch actuator is selectively positioned between an opened position and a closed position. The actuator bias element includes a first end acting on the switch actuator and a second end coupled to the switch housing. The slider assembly is linked to the switch actuator. The slider assembly includes a first slider and a second slider each slidably movable with respect to the switch housing along a linear axis. The first slider is independently movable relative to the second slider. The actuator bias element and the slider assembly are responsive to the position of the switch actuator to effect a switch closing operation and a switch opening operation.

20 Claims, 5 Drawing Sheets

(56) References Cited

U.S. PATENT DOCUMENTS

| | | | | | |
|---|---|---|---|---|---|
| 3,599,135 | A * | 8/1971 | Gryctko | H01H 71/1081 | 337/6 |
| 3,614,697 | A * | 10/1971 | Dunham | H01H 73/14 | 337/8 |
| 3,958,197 | A * | 5/1976 | Gryctko | H01H 83/22 | 361/45 |
| 3,958,204 | A * | 5/1976 | Gryctko | H01H 71/121 | 361/45 |
| 3,997,745 | A * | 12/1976 | Marquardt | H01H 13/20 | 200/409 |
| 5,355,274 | A * | 10/1994 | Marach | H01H 85/547 | 361/833 |
| 5,559,662 | A * | 9/1996 | Happ | H01H 85/547 | 361/124 |
| 6,717,505 | B1 * | 4/2004 | Bruchmann | H01H 85/32 | 337/194 |
| 7,115,829 | B2 * | 10/2006 | Schmid | H01H 21/42 | 200/400 |
| 7,368,676 | B2 * | 5/2008 | Mattlar | H01H 19/24 | 200/400 |
| 7,474,194 | B2 * | 1/2009 | Darr | H01H 9/104 | 337/8 |
| 8,614,618 | B2 * | 12/2013 | Darr | H01H 9/104 | 337/8 |
| 8,854,174 | B2 * | 10/2014 | Su | H01H 9/104 | 337/194 |
| 9,312,081 | B2 * | 4/2016 | Douglass | H01H 9/547 | |
| 9,837,235 | B2 * | 12/2017 | Darr | H01H 85/153 | |
| 9,842,719 | B2 * | 12/2017 | Shea | H01H 89/04 | |
| 10,032,578 | B2 * | 7/2018 | Darr | H01H 71/505 | |
| 10,580,597 | B2 * | 3/2020 | Darr | H01H 71/527 | |
| 2015/0380196 | A1 * | 12/2015 | Darr | H01H 85/153 | 337/201 |

* cited by examiner

HIGH CURRENT, COMPACT FUSIBLE DISCONNECT SWITCH WITH DUAL SLIDER ASSEMBLY AND AN ACTUATOR BIAS ELEMENT

CROSS REFERENCE TO RELATED APPLICATIONS

This application is a continuation application of and claims priority to U.S. patent application Ser. No. 17/368,080 filed on Jul. 6, 2021, which claims the benefit and priority of Chinese Patent Application No. 202010643389.7 filed on Jul. 6, 2020, the disclosure of which are incorporated by reference herein in their entireties as part of the present application.

BACKGROUND OF THE DISCLOSURE

The field of the disclosure relates generally to fusible circuit protection devices, and more specifically to fusible disconnect switch devices configured for high current industrial applications.

Fuses are widely used as overcurrent protection devices to prevent costly damage to electrical circuits. Fuse terminals typically form an electrical connection between an electrical power source and an electrical component or a combination of components arranged in an electrical circuit. One or more fusible links or elements, or a fuse element assembly, is connected between the fuse terminals, so that when electrical current flowing through the fuse exceeds a predetermined limit, the fusible elements melt and open one or more circuits through the fuse to prevent electrical component damage.

A variety of fusible disconnect switch devices are known in the art wherein fused output power may be selectively switched from a power supply input. Existing fusible disconnect switch devices, however, have not completely met the needs of the marketplace and improvements are desired. Specifically, high current applications present additional demands on fusible switch disconnect devices that are not well met by existing fusible disconnect devices.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE DISCLOSURE

Exemplary embodiments of fusible disconnect switch devices are described below with enhanced features for high current industrial power supplies. Method aspects will be in part apparent and in part explicitly discussed in the description below.

Figure 1A:
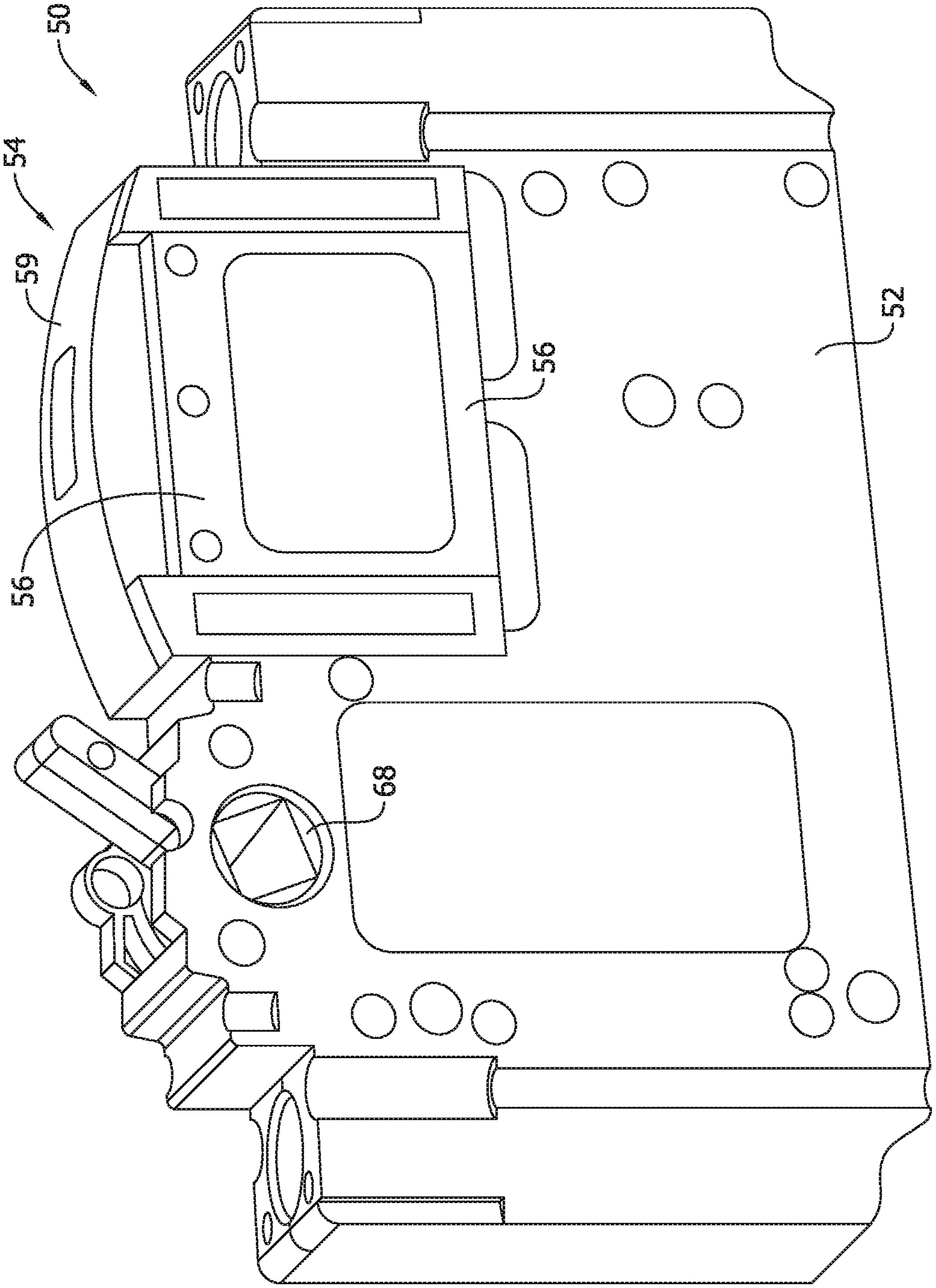
FIG. 1A is a side view of a fusible switch disconnect device.
Figure 1B:
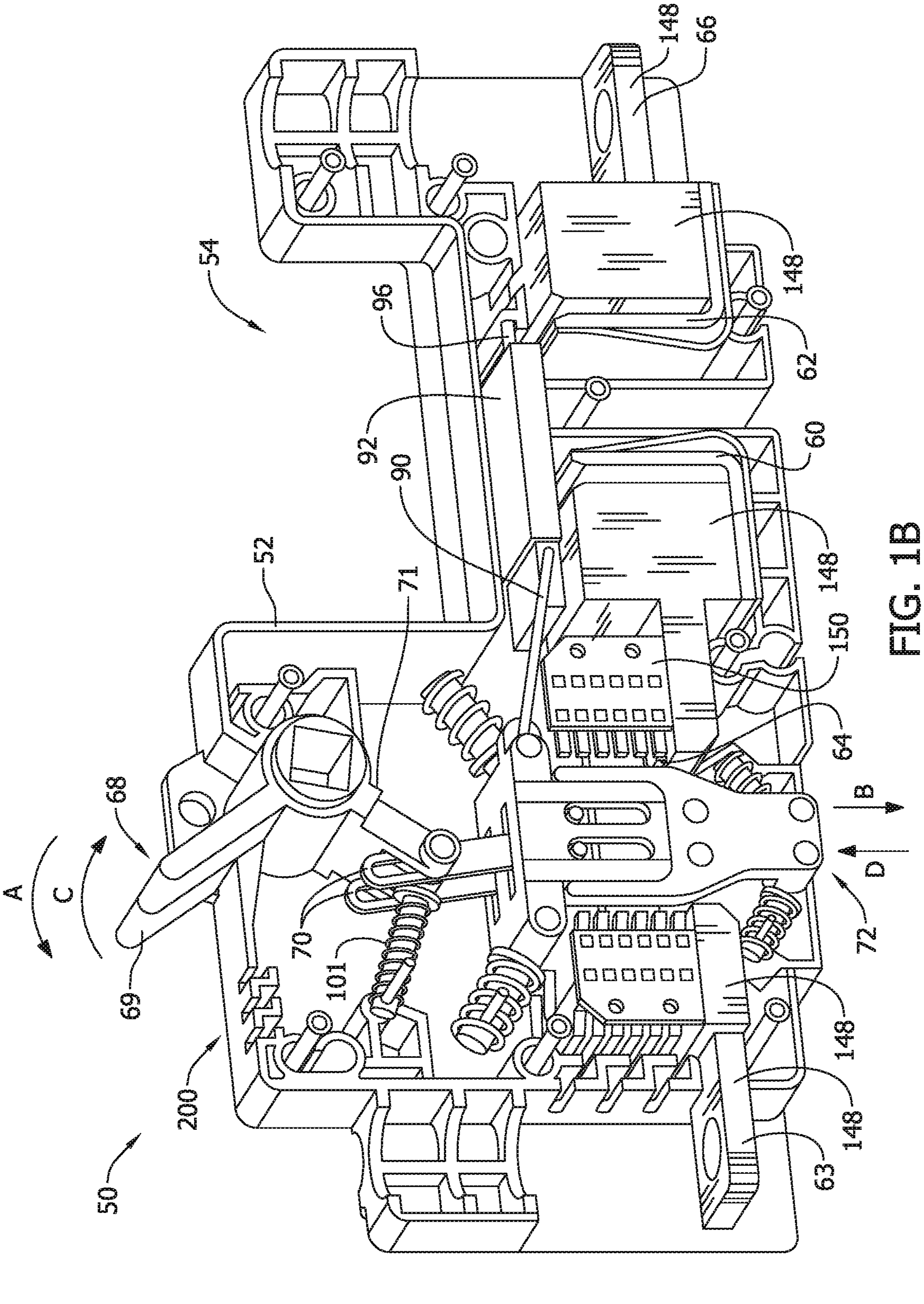
FIG. 1B is a view similar to FIG. 1A but revealing the internal components in the switch housing and without a fusible module.

FIGS. 1A and 1B show an exemplary fusible disconnect switch device 50. FIG. 1A is a perspective view of the disconnect switch device 50 and FIG. 1B is a similar view of the disconnect switch device 50 without a fuse module 54 installed, revealing internal components of the disconnect switch device 50. In the exemplary embodiment, the disconnect switch device 50 includes a non-conductive switch housing 52 configured or adapted to receive a retractable rectangular touch-safe power fuse module 54. The fuse module 54 is similar in some aspects to a CUBEFuse™ power fuse module commercially available from Bussmann by Eaton of St. Louis, Missouri. The fuse module 54 is configured, however, for higher current industrial power applications than previously available CUBEFuse™ power fuse modules are capable of meeting. In contemplated examples the fuse module 54 may have a voltage rating of 500 VDC and an ampacity rating in contemplated examples of 400 A or 600 A. The switch housing 52 and the disconnect switch device 50 are likewise designed to handle such high current applications, including but not limited to an improved switching mechanism described below to more capably meet the needs of high current industrial power systems.

In the exemplary embodiment, a line side fuse clip 60 (FIG. 1B) may be situated within the switch housing 52 and may receive one of the terminal blades (not shown) of the fuse module 54. A load side fuse clip 62 may also be situated within the switch housing 52 and may receive the other of the fuse terminal blades (not shown). The line side fuse clip 60 may be electrically connected to a line side terminal 63 including a stationary contact 64. The load side fuse clip 62 may be electrically connected to a load side terminal 66.

A rotary switch actuator 68 is further provided on the switch housing 52, and is formed with a lever 69 that protrudes from the switch housing 52 for manual positioning of the switch actuator 68 between the operating positions described below to open and close the switch assembly 200 including movable contacts 74, 76 (see FIG. 2). The switch actuator 68 is mechanically coupled to one end of a link 70 and an actuator bias element 101 via a projecting arm 71 extending radially away from a round main body of the switch actuator 68. The round body is mounted in the switch housing 52 for rotation about its center axis to operate the switch mechanism.

The link 70, at its other end, is in turn coupled to a slider assembly 72. The slider assembly 72 carries a pair of movable contacts 74 and 76. Another stationary contact 80 (see FIG. 2) electrically connected to the line side terminal 63 is also provided. Electrical connection to power supply circuitry may be made to the line side terminal 63, and electrical connection to load side circuitry may be made to the load side terminal 66 in a known manner. A variety of connecting techniques are known (e.g., screw clamp terminals, box lug terminals, bolted connections, terminal stud connections, bus bar connections, and the like) and may be utilized to establish the line and load side connections to external circuitry to be protected by the fuse module 54.

Disconnect switching may be accomplished by grasping the lever 69 and rotating the switch actuator 68 from an "off" or "opened" position in the direction of arrow A, causing the actuator bias element 101 to move and then causing the link 70 to move the slider assembly 72 linearly in the direction of arrow B in sequential stages of actuation explained further below, and ultimately moving the switch contacts 74 and 76 toward the stationary contacts 64 and 80. Eventually, the switch mechanism closes when the contacts 74 and 76 become mechanically and electrically engaged to the stationary contacts 64 and 80. With the switch mechanism closed, the circuit path through the fuse module 54 between the line and load side terminals 63 and 66 is completed when the fuse terminal blades are received in the line and load side fuse clips 60 and 62.

When the lever 69 is moved to rotate the switch actuator 68 in the opposite direction indicated by arrow C, the actuator bias element 101 moves and causes the link 70 to move, which causes the slider assembly 72 to move linearly in the direction of arrow D in sequential stages of actuation explained further below, and ultimately pull the switch contacts 74 and 76 away from the stationary contacts 64 and 80 to open the circuit path through the fuse module 54. As such, by moving the switch actuator 68 to a desired position with the lever 69, the fuse module 54 and associated load side circuitry may be connected and disconnected from the line side circuitry while the line side circuitry remains "live" in full power operation. As seen in FIGS. 1A and 1B, the switch actuator 68 is configured with a square internal bore that may receive an external shaft such that the switch actuator 68 may be remotely rotated in an automatic manner. In still other embodiments, the switch housing 52 may include an internal trip mechanism causing the switch actuator 68 to rotate if certain current conditions are detected and therefore prevent the fuse module 54 from opening. Current detection and control circuitry may optionally be provided to operate the trip mechanism when provided.

The fuse module 54 may also be simply plugged into the fuse clips 60, 62 or extracted therefrom to install or remove the fuse module 54 from the switch housing 52. The fuse housing 56 projects from the switch housing 52 and is accessible from the exterior of the switch housing 52 so that a person can grasp the handle 59 and pull it in the direction of arrow D to disengage the fuse terminal blades from the line and load side fuse clips 60 and 62 such that the fuse module 54 is completely released from the switch housing 52. Likewise, a replacement fuse module 54 can be grasped by hand and moved toward the switch housing 52 in the direction of Arrow B to engage the fuse terminal blades to the line and load side fuse clips 60 and 62. Such plug-in connection and removal of the fuse module 54 advantageously facilitates quick and convenient installation and removal of the fuse module 54 without requiring separately supplied fuse carrier elements and without requiring tools or fasteners common to other known fusible disconnect switch devices.

Additionally, the disconnect switch device 50 is rather compact and can easily occupy less space in a fusible panelboard assembly, for example, than conventional in-line fuse and circuit breaker combinations. In particular, the fuse module 54 occupies a smaller area, sometimes referred to as a footprint, in the panel assembly than non-rectangular fuses having comparable ratings and interruption capabilities. Reductions in the size of panelboards are therefore possible, with increased interruption capabilities. In one example, the overall footprint of the disconnect switch device 50 is approximately 40% to 50% of a known disconnect switch device of the same current rating.

In ordinary use, the circuit is preferably connected and disconnected at the switch contacts 64, 74, 76 and 80 rather than at the fuse clips. Electrical arcing that may occur when connecting/disconnecting the circuit may be contained at a location away from the fuse clips to provide additional safety for persons installing, removing, or replacing fuses. By opening the disconnect switch device 50 with the switch actuator 68 before installing or removing the fuse module 54, any risk posed by electrical arcing or energized metal at the fuse module and housing interface is eliminated. The fusible disconnect switch device 50 is accordingly believed to be safer to use than many known fused disconnect switches.

The fusible disconnect switch device 50 includes further features such as a safety cover 92 driven by an interlock element 90 that is coupled to the switch actuator 68, which improves the safety of the disconnect switch device 50 in the event that a person attempts to install the fuse module 54 without first operating the switch actuator 68 to disconnect the circuit through the fuse module 54. An interlock shaft 96 may be used to prevent a person from attempting to remove the fuse module 54 without first operating the switch actuator 68 to disconnect the circuit through the fuse module 54.

With the increased rating, the arcing energy between the movable contacts 74, 76 and the stationary contacts 64, 80 may be increased. To eliminate arcing of increased energy, the distance between the movable contacts 74, 76 and the stationary contacts 64, 80 may be increased such that the number of arc plates (not shown) may be increased in an arc chute 150 (see FIG. 1B). Further, a metal sheet 148 may be soldered on the contacts 74, 76, 64, 80 and terminals 63, 66 to help dissipate the heat. The metal sheet may be made of copper, aluminum, or other metal that enables the disconnect switch device 50 to function as described herein. In one example, the amount of copper placed around the contacts 74, 76, 64, 80 and terminals 63, 66 is approximately three times more than a known disconnect switch device of the same current rating.

Figure 2:
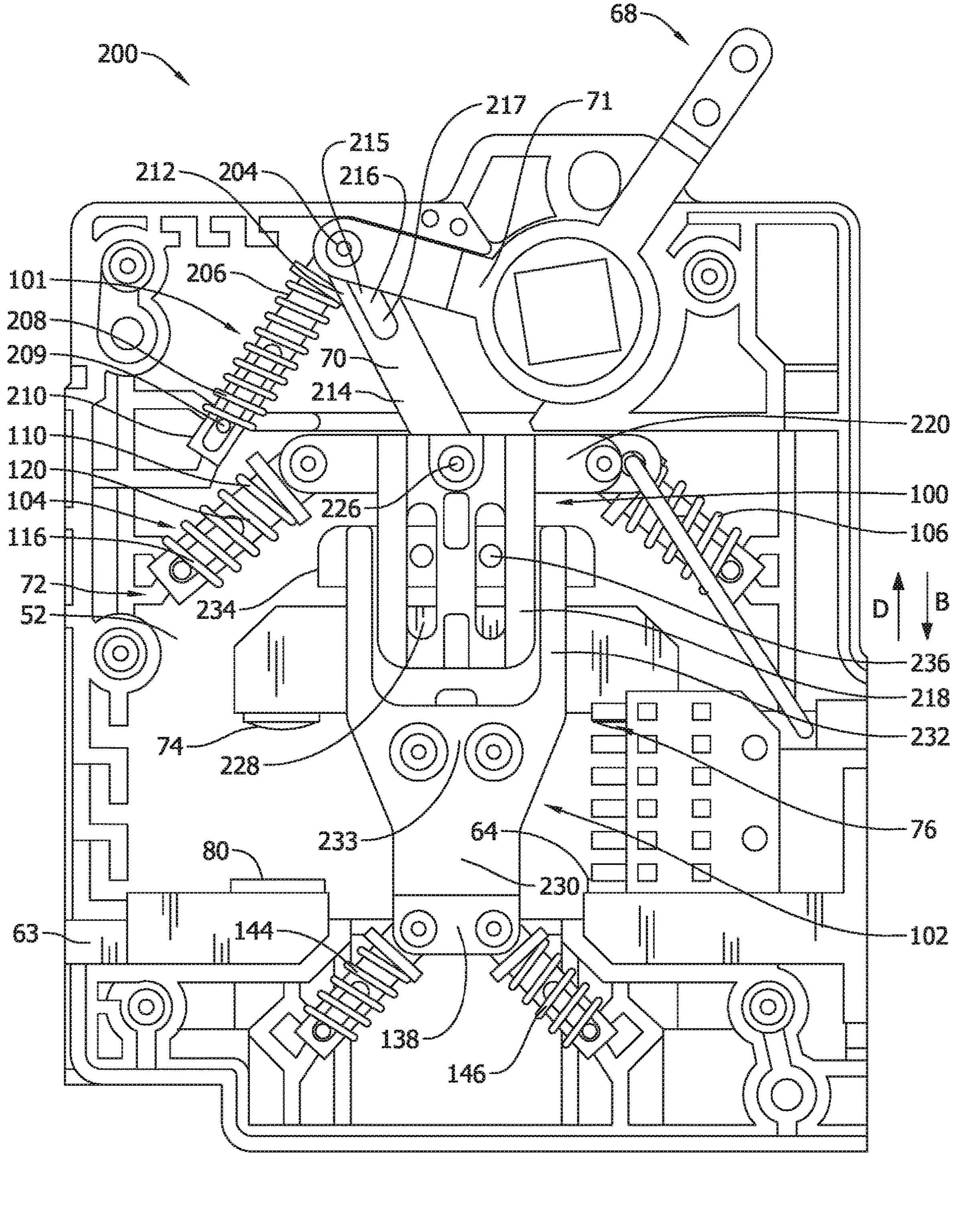
FIG. 2 is an enlarged perspective view of the switch assembly for the switch disconnect device shown in FIGS. 1A-1B.

FIG. 2 is an enlarged view of the switch assembly 200 included in the disconnect switch device 50. In the exemplary embodiment, the switch assembly 200 includes the switch actuator 68, the actuator bias element 101, and the slider assembly 72. The actuator bias element 101 is rotatably coupled to the switch actuator 68 at a joint 204. The slider assembly 72 is linked to the switch actuator 68 and the actuator bias element 101 at the joint 204 via the link 70. The slider assembly 72 and the actuator bias element 101 are responsive to the position of the switch actuator 68 to effect a switch closing operation or a switch opening operation.

In the exemplary embodiment, the actuator bias element 101 is a coil spring. The actuator bias element 101 includes a first end 206 and a second end 208 opposite the first end 206. The first end 206 of the actuator bias element 101 acts on the switch actuator 68. The second end 208 of the actuator bias element 101 may be coupled to the switch housing 52. In one example, the second end 208 is attached to a bar 209. The bar 209 is coupled to the switch housing 52 by being inserted into a hole (not shown) formed in the switch housing 52. In some embodiments, a shaft 210 is included for the actuator bias element 101 to wind around. The shaft 210 provides a structural support for the actuator bias element 101 such that the actuator bias element 101 slides along the shaft 210 when the actuator bias element 101 compresses or decompresses.

In the exemplary embodiment, the link 70 includes a first end 212 and a second end 214 opposite the first end 212. The first end 212 is coupled to the switch actuator 68 and the actuator bias element 101. The second end 214 is coupled to the slider assembly 72. The link 70 further includes a link slot 216. The link slot 216 may be elongated and oriented generally parallel to the longitudinal axis of the link 70. The link slot 216 may be positioned proximate the first end 212 of the link 70. The link slot 216 includes a first end 215 and a second end 217 that is opposite the first end 215 and further away from the first end 212 of the link 70 than the first end of 215. In some embodiments, the link 70 is coupled to the joint 204, with the joint 204 extending through the link slot 216. During the opening and closing operation of the disconnect switch device 50, the link 70 slides along the link slot 216 between the first end 215 and the second end 217. The link 70 may be made of metal, such as steel, copper, or other material that enables the link 70 to function as described herein.

In some embodiments, the switch assembly 200 includes two links 70 (see FIG. 1B). The links 70 are positioned on opposite sides of the actuator bias element 101. The dual-link configuration ensures the forces from the actuator bias element 101 upon the switch actuator 68 and upon the slider assembly 72 is balanced. The dual-link configuration also divides the impact of the swift motion of the slider assembly 72 on the links 70.

In operation, the rotation of the switch actuator 68 causes the joint 204 to slide in the link slot 216 and the actuator bias element 101 to pivot about the second end 208 of the actuator bias element 101. While pivoting, the actuator bias element 101 compresses and stores energy, or decompresses and releases energy. During the downward motion of the joint 204, when the joint 204 reaches the second end 217 of the link slot 216, the joint 204 engages the link 70 and the combined force from the actuator bias element 101 and the switch actuator 68 is applied to the link 70 and further to the slider assembly 72. During the upward motion of the joint 204, when the joint 204 reaches the first end 215 of the link slot 216, the joint 204 engages the link 70 and the combined force from the actuator bias element 101 and the switch actuator 68 is applied to the link 70 and further to the slider assembly 72. Accordingly, the actuator bias element 101 increases the force applied to the slider assembly 72 during the switch closing or opening operation. Further, because at first the joint 204 slides along the link slot 216 without engaging the link 70, the force needed to initiate the closing or opening operation is reduced to a force needed to compress the actuator bias element 101, instead of moving a part or the entirety of the slider assembly 72. In addition, during the opening or closing operation, the impact of the operation momentum is focused on the link slot 216. In a known disconnect switch device, a slot is position on the switch actuator 68 such as on the projecting arm 71. Because the switch actuator 68 is made of insulated material such as plastic for safety reasons, the switch actuator 68 may not be strong enough to withstand the momentum from the high speed opening or closing and, as a result, the life of the disconnect switch device may be reduced. With the link slot 216 positioned on the link 70, because the link may be made of more durable material like metal than the insulated material for the switch actuator 68, the link 70 can withstand the impact from the operational momentum. Accordingly, the life of the disconnect switch device 50 is extended.

The slider assembly 72 includes a first or upper slider 100 and a second or lower slider 102 each slidably movable with respect to the switch housing 52 along a linear axis in the direction of arrows B and D. That is, in the example shown the first and second sliders 100, 102 are respectively movable along coincident linear axes. The first slider 100 further is independently movable relative to the second slider 102. Specifically, the first slider 100 is movable relative to the second slider 102 in a first stage of opening and closing operations while the second slider remains stationary. The second slider 102 carries the movable contacts 74, 76 to make or break an electrical connection with the stationary contacts 64, 80 and is moved by the first slider 100 in a second stage of the switch closing and opening operations.

The first slider 100 is biased by a pair of bias elements 104, 106 on either side of a first end of the first slider 100. One end 110 of the bias element 104 is coupled to the first slider 100. The other end 116 of the bias element 104 is coupled to the switch housing 52. In between the ends 110, 116 the bias element 104 includes a helical compression spring portion 120.

The bias element 106 is substantially identically formed as the bias element 104 shown and is similarly connected to the first slider 100 and the switch housing 52. Because the first slider 100 is movable in the direction of arrows B and D along the linear axis, the bias elements 104, 106, which are mechanically connected to the first slider 100, pivot about their ends as the first slider 100 is moved, while the opposing ends of the bias elements 104, 106 are held in place. The pivotal mounting of the bias elements 104, 106 allows them to store and release force and energy to facilitate opening and closing of the switch contacts 74, 76 as they are pivoted to different positions. In some embodiments, similar to the actuator bias element 101, a shaft 210 is provided such that the bias element 104, 106 winds around the shaft 210. The bias element 104, 106 may be coupled to the switch housing 52 via a bar 209.

The first slider 100 may be formed from a plastic material known in the art. In the exemplary embodiment, the first slider 100 includes a body 218 and two arms 220 extending from the body 218. The arms 220 may extend perpendicularly from the body 218. Each of the bias elements 104, 106 are coupled to the first slider 100 at one of the arms 220. The link 70 may be rotatably coupled to the first slider at a midpoint 226 of the first end of the first slider 100.

In the exemplary embodiment, the body 218 of the first slider 100 further includes at least one slider slot 228. The slider slot 228 may be oriented longitudinally along the body 218. In some embodiments, two slider slots 228 are included in the body 218. The two slider slots 228 may be parallel to one another.

The second slider 102 may also be formed from a plastic material known in the art. In the exemplary embodiment, the second slider 102 includes a body 230 and arms 232. The arm 232 extends longitudinally away from an end 233 of the body 230. At the end of the arm 232, a bar 234 is coupled to the arms 232. At least one pin 236 is positioned on the bar 234. In some embodiments, the second slider 102 includes a pair of pins 236. The pin 236 is slidably coupled to the first slider 100 in the slider slot 228 such that the pin 236 slides along the slider slot 228 during the opening and closing operation of the disconnect switch device 50. Proximate to the end 233 of the body 230, the second slider 102 carries at least one movable contact 74, 76 toward or away from the stationary contact 64, 80 to make or break an electrical connection at the line side terminal 63 and/or the load side terminal 66 (see FIG. 1B). In some embodiments, the disconnect switch device 50 includes a pair of stationary contacts 64 and a pair of movable contacts 74 for the line side terminal 63, and similarly, includes a pair of stationary contacts 80 and a pair of movable contacts 76. This dual-contact configuration provides more secure electrical contact between the stationary contacts 64, 80 and the movable contacts 74, 76 than a single-contact configuration.

In the exemplary embodiment, the second slider 102 is coupled to ends of bias elements 144, 146 proximate an end 138 of the second slider 102. The bias elements 144, 146 are coupled to the switch housing 52 at their other ends. In some embodiments, a shaft 210 is provided such that the bias element 144, 146 winds around the shaft 210. The bias element 144, 146 may be coupled to the switch housing 52 via a bar 209.

Figures 3A, 3B, 3C, 3D:
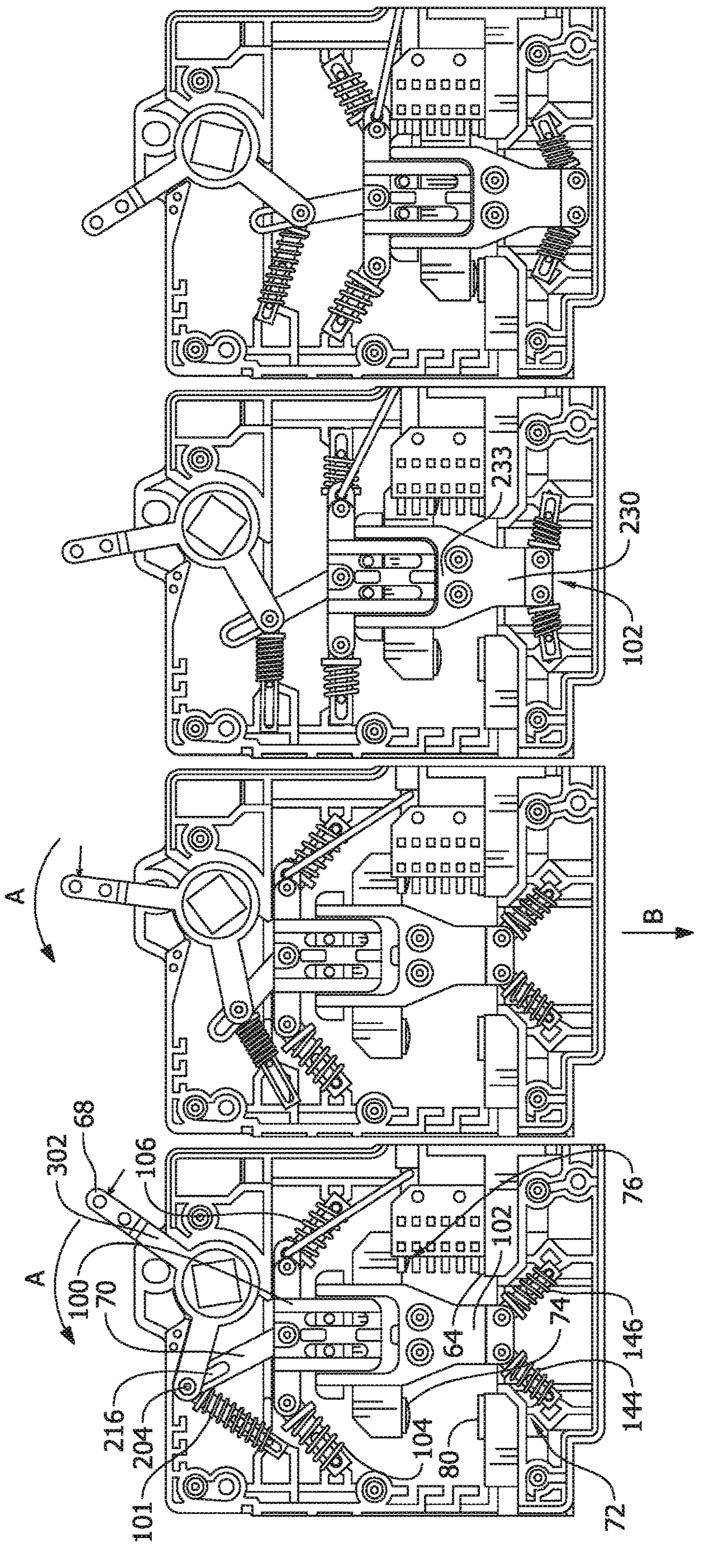
FIGS. 3A, 3B, 3C and 3D illustrate sequential activation of the switch mechanism in a switch closing operation.

The switch closing operation is illustrated in FIGS. 3A through 3D. FIG. 3A shows a preparation stage of the closing operation. In FIG. 3A, the switch actuator 68 is rotated in the direction of arrow A from the opened or off position 302 and the movable contacts 74, 76 are separated from the stationary contacts 64, 80. The actuator bias element 101 starts to be compressed and stores energy. The joint 204 slides along the link slot 216 of the link 70 toward the link 70. The first and second sliders 100, 102 and their bias element 104, 106, 144, 146 remain stationary during the preparation stage, and are mechanically isolated from the actuator bias element 101. This isolation mechanism reduces the force needed to initiate the closing operation to a force needed to compress the actuator bias element 101, instead of a force needed to move the first slider 100 or the entire slider assembly 72.

In FIG. 3B, the switch actuator 68 is further rotated in the direction of arrow A and a first stage of the switch closing operation is illustrated. In the first stage, the actuator bias element has reached its maximum compressed state, and starts to release its stored energy, pushing the joint 204 toward the second end 214 of the link 70. In the first stage, the joint 204 has reached the end of the link slot 216 of the link 70 and pushes against the link 70. That is, the switch actuator 68 and the actuator bias element 101 engage the link 70 and the first slider 100 and the combined force from the switch actuator 68 and the actuator bias element 101 is applied to the first slider 100. The first slider 100 is moved downwardly in the direction of arrow B by the link 70 as the switch actuator 68 rotates and the actuator bias elements releases stored energy, while the second slider 102 is maintained stationary. The release of the stored energy in the actuator bias element 101 adds to the force applied on the first slider 100, besides the force from the switch actuator 68. Accordingly, the speed of the closing operation is increased, compared to a switch assembly that does not include an actuator bias element 101. The bias elements 104, 106 coupled to the first slider 100 are compressed and store energy as the first slider 100 descends. The descending first slider 100 also causes the bias elements 104, 106 to pivot from their initial position shown in FIG. 3A. The descending first slider 100 also causes the actuator bias element 101 to pivot further away from its initial position shown in FIG. 3A. The second slider 102 and its bias elements 144, 146 are mechanically isolated from the first slider 100, however, and are not affected by this stage of operation. The mechanical isolation of the second slider 102 from the first slider 100 at the first stage reduces force needed to turn the switch actuator 68, compared to a second slider being coupled to a first slider all the time. As a result, force needed for the first stage of the closing operation is the force needed to move the first slider 100 downward, instead of both the first and second sliders.

FIG. 3C illustrates a second stage of the switch closing operation. As the first slider 100 is descending, the actuator bias element 101 is being compressed and stores energy in the compression. The first slider 100 has now descended further and pushes against the send slider 102 at the end 233 of the body 230 of the second slider 102. In this stage, the second slider 102 is driven by the first slider 100 and the second slider 102 moves with the first slider 100. That is, the sliders 100, 102 descend together in this stage. As the second slider 102 begins to move downwardly in the direction of arrow B, the bias elements 144, 146 are compressed to store energy as well as pivoted as shown. The switch contacts 74, 76 are carried downward with the second slider 102 toward the stationary contacts 64, 80. In the position shown in FIG. 3C, the bias elements 104, 106 coupled to the first slider 100 reach a maximum state of compression.

Figures 4A, 4B, 4C, 4D:
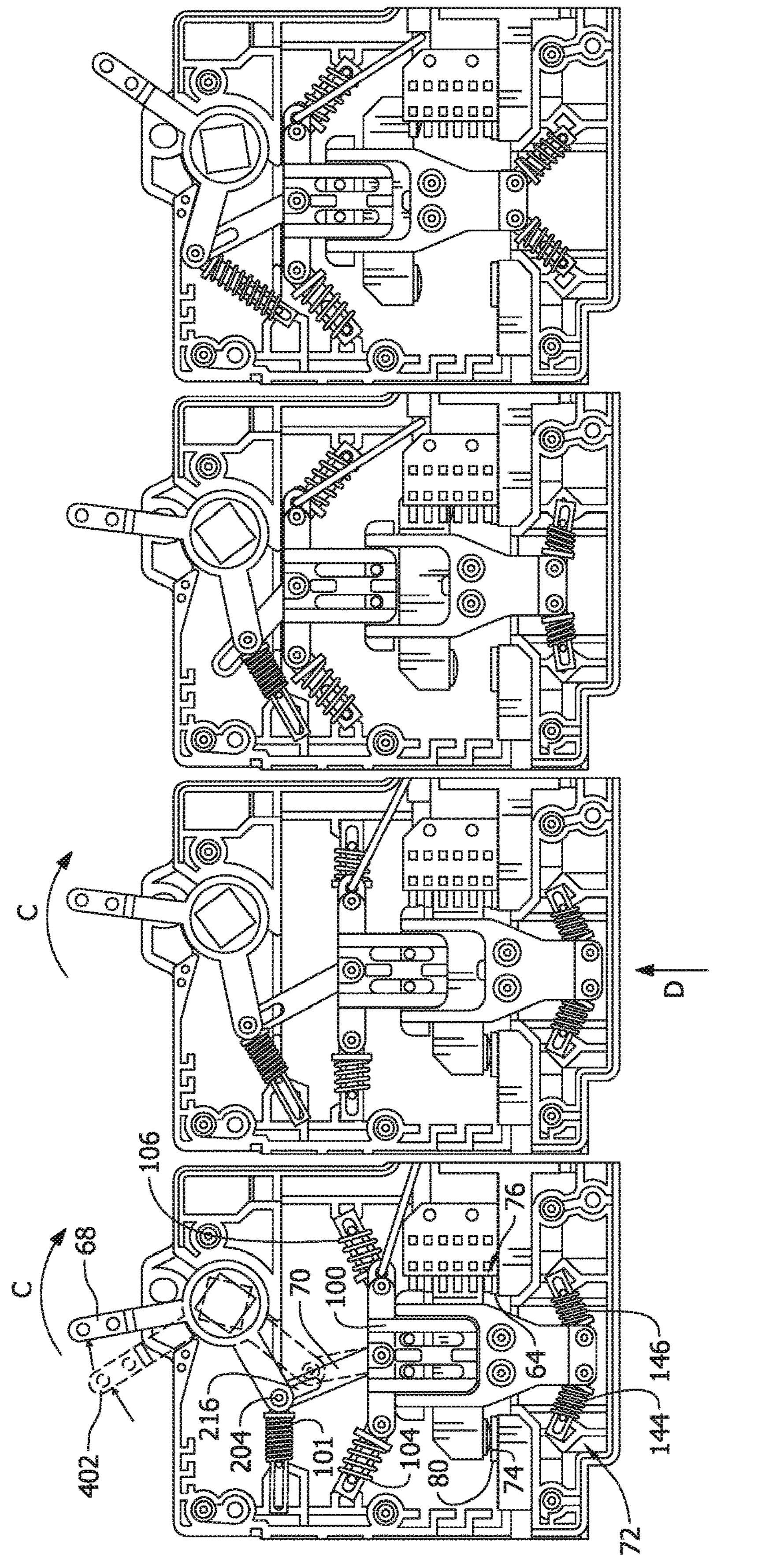
FIGS. 4A, 4B, 4C and 4D illustrate sequential activation of the switch mechanism in a switch opening operation.

The pivoting bias elements 104 and 106 begin to decompress as they pivot past the point of equilibrium shown in FIG. 3C. The actuator bias element 101 has not reached its maximum decompressed state and continues to release the stored force. Stored force in the springs as they decompress is released to drive the first slider 100 downward apart from rotation of the switch actuator 68. Shortly after this begins to occur, the pivoting bias elements 144, 146 connected to the second slider 102 reach their maximum state of compression and also begin to release stored force as they are further pivoted. The bias elements 144, 146 thereafter also drive the second slider 102 downward. The combined release of force in the actuator bias element 101 and the bias elements 104, 106, 144, 146 causes the switch contacts 74, 76 to quickly and firmly close. The actuator bias element 101 increases the force pushing the slider assembly 72 and therefore the speed of the closing operation is increased. Because the first slider 100 is linked directly to the switch actuator 68, the switch actuator 68 is moved to the fully closed position under force (FIG. 4D). The switch mechanism closes with a secure, automatic snap action once the bias elements 104, 106, 144, 146 move past their points of equilibrium. Such quick automatic closure is advantageous for high voltage, high current power systems that present severe arcing potential.

FIGS. 4A through 4D illustrate the switch opening operation. FIG. 4A shows a preparation stage of the opening position. In FIG. 4A, the switch actuator 68 is rotated in the direction of arrow C, starting from the closed position 402. The switch contacts 74, 76 are closed and the circuit path through them is completed. The actuator bias element 101 starts to be compressed and stores energy. The joint 204 slides along the link slot 216 of the link 70 toward the first end 215 of the link 70. The first and second sliders 100, 102 and their bias elements 104, 106, 144, 146 remain stationary. At the preparation stage, the actuator bias element 101 is mechanically isolated from the first and second sliders 100, 102 and their bias elements 104, 106, 144, 146. This isolation mechanism reduces the force needed to initiate the opening position to a force needed to compress the actuator bias element 101, instead of a force needed to move the first slider 100 or the first and second sliders 100, 102.

FIG. 4B shows a first stage of the opening operation wherein the switch actuator 68 is further rotated in the direction of arrow C. The actuator bias element 101 has passed the maximum compressed point and the stored energy is released into a force pushing the switch actuator in the direction of arrow C. Accordingly, the speed of the opening operation in increased. Further, the joint 204 has reached the end of the link slot 216 of the link 70 such that the joint 204, the actuator bias element 101, and the switch actuator 68 engages the link 70 and the first slider 100 to move the first slider 100. In the first stage, the first slider 100 is pulled upwardly in the direction of arrow D while the second slider 102 remains stationary. The bias elements 104, 106 coupled to the first slider 100 are compressed and begin to store energy as they are pivoted from their initial position. The second slider 102 and its bias elements 144, 146 are mechanically isolated from the first slider 100 and are not affected by this stage of operation. Again, this mechanical isolation is advantageous because the force needed for the first stage of the opening operation is the force needed to move the first slider 100, instead of both the first and second sliders.

In FIG. 4C, the switch actuator 68 is further rotated and the first slider 100 has been lifted an amount sufficient to the point where the pins 236 push against the body 218 of the first slider 100 at an end of the slider slot 228. The second slider 102 engages the first slider 100 through the engagement of pins 236 with the body 218 of the first slider 100. The first and second sliders 100, 102 are now mechanically coupled and ascend together with the first slider 100 driving upward movement of the second slider 102. The bias elements 144, 146 connected to the second slider 102 are compressed and begin to store energy as they are pivoted from their initial position shown in FIG. 4A when the second slider 102 begins to move.

As shown in FIG. 4C, the actuator bias element 101 has not reached its maximum decompressed state and the bias elements 104, 106 coupled to the first slider 100 have pivoted past the point of equilibrium. The actuator bias element 101 continues to release stored energy, and the bias element 104, 106 are now releasing stored energy to force the first slider 100 upward and drive the switch contacts 74, 76 away from the stationary contacts 64, 80. The released force on the first slider 100 accelerates the upward movement of the second slider 102 that is now engaged to the first slider 100 and causes the bias elements 144, 146 connected to the second slider 102 to pivot past their points of equilibrium. As this happens, the bias element 144, 146 also start to release stored energy to drive the second slider 102 upward and drive the switch contacts 74, 76 away from the stationary contacts 64, 80 with increased force. In this stage, all of the bias elements 104, 106, 144, 146 and the actuator bias element 101 cooperate to drive the switch mechanism to the fully opened position.

The combined release of force in the actuator bias element 101 and the bias elements 104, 106, 144, 146 causes the switch contacts 74, 76 to quickly open and separate. Because the first slider 100 is linked directly to the switch actuator 68, the switch actuator 68 is moved to the final opened position shown in FIG. 4D under force. The switch mechanism opens with a secure, automatic snap action once the actuator bias element 101 and the bias elements 104, 106, 144, 146 move past their points of equilibrium. Such quick automatic opening is advantageous for high voltage, high current power systems that present severe arcing potential.

At least one technical effect of the systems and methods described herein includes (a) increasing opening and/or closing speed of the switch disconnect device; (b) reducing the force needed to be applied to a switch actuator in the opening and/or closing operation; and (c) increasing the life expectancy of a switch actuator and the disconnect switch device.

The benefits of the inventive concepts described are now believed to have been amply illustrated in relation to the exemplary embodiments disclosed.

An embodiment of a fusible disconnect switch device is provided. The disconnect switch device includes a switch housing configured to accept a pluggable fuse module, and a line side terminal and a load side terminal in the switch housing. The disconnect switch device further includes a switch actuator, an actuator bias element, and a slider assembly. The switch actuator is selectively positionable between an opened position and a closed position. The actuator bias element includes a first end and a second end opposite the first end, the first end acting on the switch actuator and the second end coupled to the switch housing. The slider assembly is linked to the switch actuator. The slider assembly includes a first slider and a second slider each slidably movable with respect to the switch housing along a linear axis. The first slider is independently movable relative to the second slider. The second slider carries at least one switch contact to make or break an electrical connection to one of the line and load side terminals, a first bias element acting on the first slider and a second bias element acting on the second slider, and the second bias element is mechanically isolated from the switch actuator in a first stage of a switch closing operation. The actuator bias element and the slider assembly are responsive to the position of the switch actuator to effect the switch closing operation and a switch opening operation.

Optionally, the actuator bias element stores energy in a preparation stage of the switch closing operation and the actuator bias element releases energy in the first stage of the switch closing operation and a second stage of the switch closing operation. The actuator bias element stores energy in a preparation stage of the switch opening operation and the actuator bias element releases energy in a first stage of the switch opening operation and a second stage of the switch opening operation. The actuator bias element moves independently from the slider assembly, and the actuator bias element is mechanically isolated from the slider assembly and the slider assembly remains stationary during the preparation stage of a switch opening operation or the switch closing operation. The fusible disconnect switch device further includes a link connecting the switch actuator to the first slider, the link further including a link slot and slidably coupled to the switch actuator at the slider slot. The link is slidably coupled to the switch actuator and the actuator bias element at a joint between the switch actuator and the actuator bias element. The fusible disconnect switch device further includes a pair of links, the switch actuator slidably coupled to the pair of links at the link slot of each of the pair of links with the pair of links positioned on opposite sides of the actuator bias element. The first and second bias elements and the actuator bias element provide a closing force in the second stage of the switch closing operation.

As further options, the first and second bias elements and the actuator bias element provide an opening force in the second stage of the switch opening operation. The second slider further includes at least one pin configured to engage the first slider in the switch opening operation and the switch closing operation. The second slider includes a pair of pins. The first slider defines at least one slider slot receiving the at least one pin therein, the at least one pin slidably coupled to the first slider at the at least one slider slot, and the second slider engages the first slider at the second stage of the switch closing operation. The first slider defines a pair of slider slots positioned generally parallel to one another. The second slider includes a pair of pins, each of the pair of pins received in one of the pair of slider slots.

Another embodiment of a fusible disconnect switch device is provided. The fusible disconnect switch device includes a switch housing, a line side terminal and a load side terminal in the switch housing, a switch actuator, an actuator bias element, a slider assembly, and a first pair of bias elements. The switch housing is configured to accept a removable fuse. The switch actuator is selectively positioned between an opened position and a closed position. The actuator bias element includes a first end and a second end opposite the first end, the first end acting on the switch actuator, and the second end coupled to the housing. The slider assembly is linked to the switch actuator. The first pair of bias elements each has a first end and a second end, the first end of each of the first pair of bias elements coupled to the housing and the second end of each of the first pair of bias elements acting upon a respective one of opposing sides of the slider assembly. The first pair of bias elements are simultaneously compressed by the selective positioning of the slider assembly or simultaneously decompressed by the selective positioning of the slider assembly to cooperatively store and release energy to effect a switch closing operation or a switch opening operation. The actuator bias element and the slider assembly are responsive to the position of the switch actuator to effect a switch closing operation or a switch opening operation via selective positioning of at least one switch contact to make or break an electrical connection to the load side terminal.

Optionally, the fusible disconnect switch device further includes a link connecting the switch actuator to the slider assembly, the link further including a slider slot and slidably coupled to the switch actuator at the slider slot. During the preparation stage of the switch opening operation or the switch closing operation, the actuator bias element is mechanically isolated from the slider assembly and the slider assembly remains stationary.

One more embodiment of a fusible disconnect switch device is provided. The disconnect switch device includes a switch housing configured to accept a pluggable fuse module, and a line side terminal and a load side terminal in the switch housing. The disconnect switch device further includes a switch actuator, an actuator bias element, and a slider assembly. The switch actuator is selectively positionable between an opened position and a closed position. The actuator bias element including a first end and a second end opposite the first end, the first end acting on the switch actuator and the second end coupled to the switch housing. The slider assembly is linked to the switch actuator. The slider assembly includes a first slider and a second slider each slidably movable with respect the switch housing along a linear axis, the second slider carries at least one switch contact to make or break an electrical connection to one of the line and load side terminals, and the first slider is independently movable relative to the second slider. The actuator bias element and the slider assembly are responsive to the position of the switch actuator to effect a switch closing operation and a switch opening operation, and the actuator bias element stores energy in a preparation stage of the switch opening operation and the actuator bias element releases energy in a first stage of the switch closing operation and a second stage of the switch closing operation.

Optionally, the fusible disconnect switch device further includes a link connecting the switch actuator to the first slider, the link further including a slider slot and slidably coupled to the switch actuator at the slider slot. The actuator bias element is mechanically isolated from the slider assembly, and the actuator bias element moves independently from the slider assembly during the preparation stage of the switch opening operation or the switch closing operation. The first and second bias elements and the actuator bias element provide a closing force in the second stage of the switch closing operation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fusible disconnect switch device comprising:

a switch housing configured to accept a pluggable fuse module;

a line side terminal and a load side terminal in the switch housing;

a switch actuator selectively positioned between an opened position and a closed position;

an actuator bias element comprising a first end and a second end opposite the first end, the first end acting on the switch actuator and the second end coupled to the switch housing; and a slider assembly linked to the switch actuator, wherein the slider assembly comprises a first slider and a second slider each slidably movable with respect to the switch housing along a linear axis, the first slider is independently movable relative to the second slider, the second slider carries at least one switch contact to make or break an electrical connection to one of the line and load side terminals, a first bias element acting on the first slider and a second bias element acting on the second slider, and the second bias element is mechanically isolated from the switch actuator in a first stage of a switch opening operation, wherein the actuator bias element and the slider assembly are responsive to position of the switch actuator to effect a switch closing operation and the switch opening operation, wherein the actuator bias element moves independently from the slider assembly.

2. The fusible disconnect switch device of claim 1, wherein the actuator bias element stores energy in a first preparation stage of the switch closing operation and the actuator bias element releases energy in the first stage of the switch closing operation and a second stage of the switch closing operation.

3. The fusible disconnect switch device of claim 1, wherein the actuator bias element stores energy in a second preparation stage of the switch opening operation and the actuator bias element releases energy in a first stage of the switch opening operation and a second stage of the switch opening operation.

4. The fusible disconnect switch device of claim 1, wherein the actuator bias element is mechanically isolated from the slider assembly and the slider assembly remains stationary during a first preparation stage of the switch closing operation or a second preparation stage of the switch opening operation.

5. The fusible disconnect switch device of claim 1, further comprising a link connecting the switch actuator to the first slider, the link further comprising a link slot and slidably coupled to the switch actuator at the link slot.

6. The fusible disconnect switch device of claim 5, wherein the link is slidably coupled to the switch actuator and the actuator bias element at a joint between the switch actuator and the actuator bias element.

7. The fusible disconnect switch device of claim 5, further comprising a pair of links, the switch actuator slidably coupled to the pair of links at the link slot of each of the pair of links with the pair of links positioned on opposite sides of the actuator bias element.

8. The fusible disconnect switch device of claim 1, wherein the first and second bias elements and the actuator bias element provide a closing force in a second stage of the switch closing operation.

9. The fusible disconnect switch device of claim 1, wherein the first and second bias elements and the actuator bias element provide an opening force in a second stage of the switch opening operation.

10. The fusible disconnect switch device of claim 1, wherein the second slider further comprises at least one pin configured to engage the first slider in the switch opening operation and the switch closing operation.

11. The fusible disconnect switch device of claim 10, wherein the second slider comprises a pair of pins.

12. The fusible disconnect switch device of claim 10, wherein the first slider defines at least one slider slot receiving the at least one pin therein, the at least one pin slidably coupled to the first slider at the at least one slider slot, and the second slider engages the first slider in a second stage of the switch closing operation.

13. The fusible disconnect switch device of claim 10, wherein the first slider defines a pair of slider slots positioned generally parallel to one another, the second slider comprises a pair of pins, each of the pair of pins received in one of the pair of slider slots.

14. The fusible disconnect switch device of claim 1, wherein the second slider receives the first slider.

15. The fusible disconnect switch device of claim 1, wherein the second slider carries a pair of movable contacts.

16. The fusible disconnect switch device of claim 15, wherein the pair of movable contacts make or break the electrical connection to one of the line and load side terminals via a pair of stationary contacts.

17. A fusible disconnect switch device comprising:

a switch housing configured to accept a pluggable fuse module;

a line side terminal and a load side terminal in the switch housing;

a switch actuator selectively positioned between an opened position and a closed position;

an actuator bias element comprising a first end and a second end opposite the first end, the first end acting on the switch actuator, and the second end coupled to the switch housing;

a slider assembly linked to the switch actuator, wherein the slider assembly comprises a first slider element and a second slider element each slidably movable with respect to the switch housing and slidably movable with respect to one another;

a first pair of bias elements each having a first end and a second end, the first end of each of the first pair of bias elements coupled to the switch housing and the second end of each of the first pair of bias elements acting upon a respective one of opposing sides of the slider assembly; and a second pair of bias elements each having a first end and a second end, the first end of each of the second pair of bias elements coupled to the switch housing and the second end of each of the second pair of bias elements acting upon a respective one of opposing sides of the slider assembly, wherein the first pair of bias elements connects to the first slider element and wherein the second pair of bias elements connects to the second slider element, wherein the actuator bias element and the slider assembly are responsive to positions of the switch actuator to effect a switch closing operation or a switch opening operation via selective positioning of at least one switch contact to make or break an electrical connection to the load side terminal, wherein the actuator bias element moves independently from the slider assembly.

18. The fusible disconnect switch device of claim 17, wherein the first pair of bias elements is simultaneously compressed by selective positioning of the slider assembly or simultaneously decompressed by the selective positioning of the slider assembly to cooperatively store and release energy to effect the switch closing operation or the switch opening operation.

19. The fusible disconnect switch device of claim 17, wherein the second pair of bias elements is simultaneously compressed by selective positioning of the slider assembly or simultaneously decompressed by the selective positioning of the slider assembly to cooperatively store and release energy to effect the switch closing operation or the switch opening operation.

20. The fusible disconnect switch device of claim 17, wherein the second slider element is driven by the first slider element in a second stage of the switch closing operation.

* * * * *